(12) United States Patent
Ruden (10) Patent No.: US 8,336,179 B2
(45) Date of Patent: Dec. 25, 2012

(54) FIXTURE ASSEMBLY

(75) Inventor: Shawn A. Ruden, Shakopee, MN (US)

(73) Assignee: Seagate Technology, Cupertino, CA (US)

( * ) Notice: Subject to any disclaimer, the term of this patent is extended or adjusted under 35 U.S.C. 154(b) by 659 days.

(21) Appl. No.: 12/463,999

(22) Filed: May 11, 2009

(65) Prior Publication Data

US 2009/0288281 A1 Nov. 26, 2009

Related U.S. Application Data

(60) Provisional application No. 61/054,669, filed on May 20, 2008.

(51) Int. Cl.
- *B23Q 1/00* (2006.01)
- *B23Q 3/00* (2006.01)
- *B23Q 7/04* (2006.01)
- *B23P 19/04* (2006.01)
- *B23P 19/00* (2006.01)
- *G01C 19/00* (2006.01)
- *G01P 3/44* (2006.01)
- *G01P 9/00* (2006.01)
- *G01P 15/08* (2006.01)
- *E01B 9/38* (2006.01)

(52) U.S. Cl. ............ 29/283; 29/257; 29/261; 29/758; 73/504.13; 238/282

(58) Field of Classification Search .......... 29/283, 29/257, 254, 261, 270, 758; 73/504.13, 504.12; 238/282, 283, 304
See application file for complete search history.

(56) References Cited

U.S. PATENT DOCUMENTS

| | | | |
|---|---|---|---|
| 2,996,330 A * | 8/1961 | Hutto | 294/196 |
| 3,930,691 A * | 1/1976 | Greene | 384/224 |
| 4,047,663 A * | 9/1977 | Reynolds et al. | 238/304 |
| 4,098,001 A | 7/1978 | Watson | |
| 4,150,791 A * | 4/1979 | Reynolds et al. | 238/282 |
| 4,357,837 A * | 11/1982 | Beardmore | 74/5 F |
| 4,385,449 A * | 5/1983 | Miller | 33/304 |
| 4,437,354 A * | 3/1984 | Capaldi | 74/5.46 |
| 4,457,040 A * | 7/1984 | Hettes | 15/180 |
| 4,556,203 A | 12/1985 | Rourke et al. | |

(Continued)

OTHER PUBLICATIONS

WWW.Heli-cal.com "Helical Products Company, manufacturer of flexible couplings, u-joints, and precision ma . . . ", Aug 27, 2007, Copyright 1997-2007 Helical Products Company, Inc. (2 pages).

(Continued)

*Primary Examiner* — Lee D Wilson
*Assistant Examiner* — Alvin Grant
(74) *Attorney, Agent, or Firm* — Braden Katterheinrich (57) ABSTRACT

A fixture assembly suitable for use in a manufacturing process includes a crowder plate coupled to a datum plate, which is configured to receive a work piece, such as a disc drive system. In some embodiments, the datum plate is configured to gimbal relative to at least a portion of the crowder plate, and substantially maintain a position along first and second directions relative to at least the portion of the crowder plate. The datum plate is also configured to translate in a third direction relative to at least the portion of the crowder plate, where the first, second, and third directions are substantially orthogonal. In some embodiments, the fixture assembly includes a platform coupled to the crowder plate, where the crowder plate may translate in at least one of the first and second directions relative to the platform.

12 Claims, 8 Drawing Sheets

U.S. PATENT DOCUMENTS

| | | | | |
|---|---|---|---|---|
| 4,557,040 A * | 12/1985 | Fairbanks | | 29/720 |
| 4,572,431 A * | 2/1986 | Arato | | 238/283 |
| 4,874,292 A * | 10/1989 | Matuska et al. | | 416/140 |
| 4,916,791 A * | 4/1990 | Clouse et al. | | 29/261 |
| 5,437,083 A * | 8/1995 | Williams et al. | | 29/235 |
| 5,515,804 A * | 5/1996 | Pollack | | 114/230.12 |
| 5,900,592 A * | 5/1999 | Sohns et al. | | 177/210 R |
| 6,247,737 B1 * | 6/2001 | Aydelott | | 294/93 |
| 6,254,075 B1 * | 7/2001 | Kozima | | 269/73 |
| 6,324,740 B1 * | 12/2001 | Siedler | | 29/254 |
| 6,428,389 B2 * | 8/2002 | Sato et al. | | 451/9 |
| 6,575,439 B1 * | 6/2003 | Costello et al. | | 267/89 |
| 6,591,759 B2 * | 7/2003 | Bullock | | 105/224.1 |
| 6,640,426 B2 * | 11/2003 | Sonnichsen | | 29/758 |
| 6,701,594 B2 * | 3/2004 | Bruyn | | 29/257 |
| 6,775,104 B2 * | 8/2004 | Hong et al. | | 360/244.1 |
| 6,862,762 B1 * | 3/2005 | Johnson et al. | | 5/601 |
| 6,928,851 B2 * | 8/2005 | Yagawa | | 72/466.4 |
| 6,955,345 B2 * | 10/2005 | Kato | | 269/61 |
| 7,421,898 B2 * | 9/2008 | Acar et al. | | 73/504.12 |
| 7,450,110 B2 * | 11/2008 | Shahoian et al. | | 345/173 |
| 7,497,139 B2 * | 3/2009 | Maier et al. | | 74/5.7 |
| 7,517,173 B2 * | 4/2009 | Pollack et al. | | 405/224.2 |
| 7,652,409 B2 * | 1/2010 | Dixon et al. | | 310/328 |
| 7,704,125 B2 * | 4/2010 | Roy et al. | | 451/41 |
| 7,726,188 B2 * | 6/2010 | Cardarelli | | 73/504.13 |
| 7,900,896 B2 * | 3/2011 | Fujita | | 269/58 |
| 8,079,259 B2 * | 12/2011 | Cardarelli | | 73/504.13 |
| 2004/0011933 A1 * | 1/2004 | Miller et al. | | 248/183.1 |
| 2004/0064933 A1 | 4/2004 | Murray et al. | | |
| 2006/0021209 A1 | 2/2006 | Pfeiffer et al. | | |
| 2007/0074434 A1 * | 4/2007 | Johnson | | 40/611.1 |
| 2008/0253019 A1 | 10/2008 | Ruden et al. | | |
| 2009/0288281 A1 * | 11/2009 | Ruden | | 29/283 |

OTHER PUBLICATIONS

WWW.ati-ia.com/products/compliance/Compensator_ShearPads. aspx "Shear Pad Data", Aug 27, 2007 (3 pages).

* cited by examiner

FIXTURE ASSEMBLY

This application claims the benefit of U.S. Provisional Application No. 61/054,669 to Ruden, entitled, "FIXTURE ASSEMBLY" and filed on May 20, 2008. The entire content of U.S. Provisional Application No. 61/054,669 is incorporated herein by reference.

TECHNICAL FIELD

The invention relates to manufacturing processes and methods of manufacturing devices, and more particularly, a fixture useful for holding a work piece during a manufacturing process.

BACKGROUND

Disc drive systems, as well as other types of data storage and retrieval systems, may be manufactured via fully automated or semi-automated assembly lines, whereby disc drive components are conveyed to various assembly stations. At each assembly station, different components may be added to the disc drive and/or different operations may be performed on the assembled components of the disc drive.

SUMMARY

In general, the invention is directed toward a fixture assembly to support a work piece, such as a disc drive system or another data storage and retrieval system, during a manufacturing (or assembly) process. The fixture assembly may be configured to be incorporated into an automated or semi-automated assembly process in which the work piece is transported between one or more assembly stations. The fixture assembly may be, for example, located at one of the assembly stations. The fixture assembly includes a crowder plate and a datum plate that is coupled to the crowder plate such that the datum plate may gimbal and translate in a substantially z-axis direction relative to at least a portion of the crowder plate. In some cases, the z-axis direction may be measured in a direction substantially perpendicular to a major surface of the crowder plate. In some embodiments, the datum plate substantially maintains an x-axis and y-axis position relative to the crowder plate in order to maintain the work piece in a known position relative to an assembly station, where the x-axis, y-axis, and z-axis are substantially orthogonal.

The datum plate is configured to receive the work piece, such that the work piece is not rigidly held relative to at least a portion of the crowder plate. In this way, the work piece may move in response to loads attributable to the manufacturing/assembly process, thereby minimizing the damage to the work piece components from the applied load. For example, the ability of the datum plate, and, therefore, the work piece, to move in response to the applied load may help limit the residual or axial loads through the work piece. In contrast, a work piece that is rigidly held relative to at least a portion of the crowder plate may internalize more manufacturing/assembly loads, which may cause mechanical shock or other potentially detrimental effects to the components of the work piece.

In one embodiment, the invention is direct to an assembly comprising a crowder plate and a datum plate configured to receive a work piece. The datum plate is configured to gimbal relative to at least a portion of the crowder plate, and substantially maintain a position along first and second directions relative to at least the portion of the crowder plate, the first and second directions being substantially orthogonal.

In another embodiment, the invention is directed to an assembly comprising a first member, a second member configured to receive a work piece, and means for coupling the first member and second member. The means for coupling is configured to allow the second member to maintain a first position along a first direction and a second direction relative to at least a portion of the first member, and allow the second member to gimbal relative to at least the portion of the first member, the first and second directions being substantially orthogonal.

In another embodiment, the invention is directed to a method comprising coupling a work piece to a datum plate, where the datum plate is coupled to a crowder plate and configured to gimbal relative to at least a portion of the crowder plate and substantially maintain a position along first and second directions relative to the crowder plate, the first and second directions being substantially orthogonal, and adding a component to the work piece while the work piece is coupled to the datum plate In another embodiment, the invention is directed to an assembly comprising a crowder plate, a datum plate configured to receive a work piece and coupled to the crowder plate, and a platform coupled to the crowder plate. The crowder plate is configured to translate along at least first and second directions relative to the crowder plate and maintain a position relative to the crowder plate in a third direction, the first, second, and third directions being substantially orthogonal.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
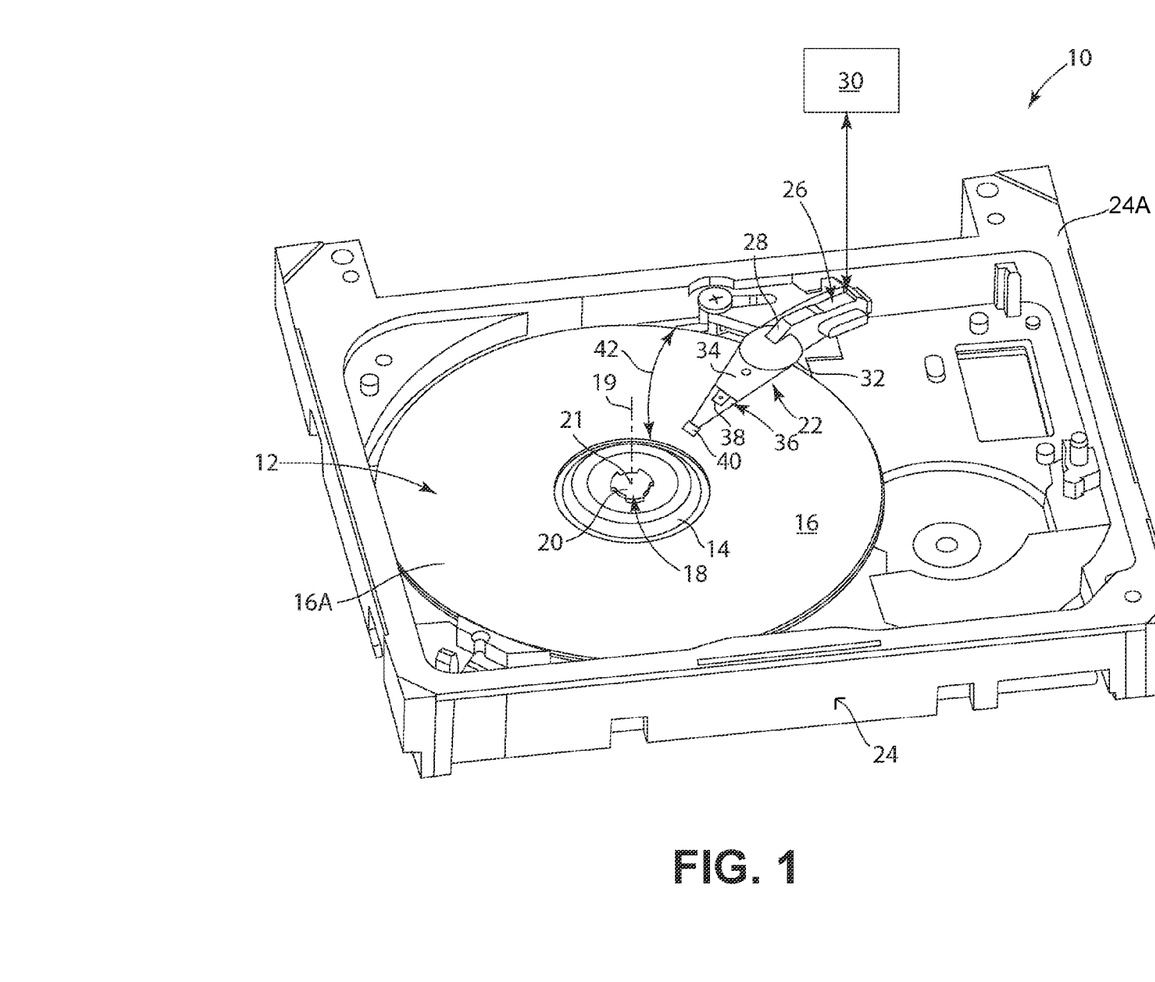
FIG. 1 is a perspective view of a disc drive system.

FIG. 1 is a perspective view of disc drive system 10. Numerous details of disc drive system 10 are removed from FIG. 1, as well as the description of FIG. 1, for clarity of illustration and description. Disc drive system 10 includes disc stack assembly 12, which includes clamp 14, disc 16, and hub 18 with protrusion portion 20. Disc drive system 10 also includes actuator 22, housing 24, arm 26, which carries actuator 22 and pivots about axis 28, drive controller 30, and e-block assembly 32. Actuator 22 includes actuator arm 34, suspension assembly 36, load beam 38, and slider 40. Housing 24 may include one or more portions (e.g., top and bottom portions) that house at least some components of disc drive system 10.

During operation of disc drive system 10, a spindle motor (not shown) rotates disc stack assembly 12 at high speeds as a transducing head (not shown) disposed on slider 40 of actuator 22 reads and writes data to disc 16. In disc drive system 10 shown in FIG. 1, a shaft (not shown) of the spindle motor is coupled to hub 18, and as the shaft rotates, hub 18 rotates disc stack assembly 12. In another type of disc drive system 10, a shaft of the spindle motor does not rotate, but rather, hub 18 is rotationally coupled to the shaft, and as the spindle motor rotates hub 18, the entire disc stack assembly 12 rotates. In some cases, the shaft of the spindle motor may extend at least partially into protrusion portion 20 of hub 18. Disc 16 is mounted around hub 18, and clamp 14 fixes a position of disc 16 relative to hub 18. As hub 18 rotates, the disc 16 rotates about axis of rotation 19. In the embodiment shown in FIG. 1, axis of rotation 19 of disc 16 is substantially aligned with a center 21 of hub 20. Disc drive system 10 may include any suitable number of discs 16 or other types of magnetic media.

In the embodiment shown in FIG. 1, clamp 14 includes at least one clamp flange that is configured to engage with a corresponding hub flange of a motor hub. This clamp 14 and hub 18 arrangement is described in further detail in commonly-assigned U.S. patent application Ser. No. 11/734,450, filed on Apr. 12, 2007 and entitled, "MAGNETIC MEDIUM STACK ASSEMBLY FOR A DATA STORAGE AND RETRIEVAL SYSTEM," which is incorporated herein by reference in its entirety. Clamp 14 may be formed from a substantially rigid material exhibiting some degree of elasticity, such as, but not limited to stainless steel, plastics or other metals exhibiting a suitable spring rate characteristic. Elasticity is preferable so that when clamp 14 is prestressed (and therefore, deflects) during installation of clamp 14 on hub 18, clamp 14 substantially returns to its original shape when the prestress load is removed. As used herein, "prestressed" and "preloaded" are used interchangeably to refer to a state in which a load is applied to clamp 14. The material for clamp 14 should be capable of exerting a desirable force on disc 16 in order to couple disc 16 to hub 18. Clamp 14 clamps disc 16 to hub 18 without the use of external hardware (e.g., screws or a retaining ring) or an adhesive, although in some embodiments, external hardware may be used.

In other embodiments, however, clamp may attach to hub 18 via a technique other than prestressing clamp 14 and interlocking flanges of clamp 14 with corresponding flanges of hub 18, in which case, a substantially rigid clamp 14 that does not exhibit elasticity may be desirable. For example, clamp 14 may couple to hub 18 with the aid of external hardware.

Actuator 22 is mounted to housing 24 via arm 26 and is pivotable relative to disc 16 about axis 28. Actuator arm 26 carries head suspension assembly 36, which includes load beam 38 and air bearing slider 40 coupled to load beam 38 by a support member. Slider 40 carries a transducing head, which may have a reader portion, such as an magnetoresistive (MR) head, for reading information from disc 16 and a writer portion (e.g., a perpendicular or parallel writer) for encoding data on disc 16.

Drive controller 30 (schematically shown in FIG. 1) is coupled to actuator 22. Drive controller 30 may be mountable within disc drive system 10 or located outside of disc drive system 10 with suitable electrical and/or mechanical connection to actuator 22. During operation, drive controller 30 receives position information indicating a location on disc 16 to be accessed. The location may be, for example, a specific bit or series of bit within one or more concentric, radially-spaced data tracks. Based on the position information, drive controller 30 provides a position signal to actuator 22, which causes arm 26 to pivot about axis 28 and move actuator 22. In one embodiment, a voice coil motor (not shown) may control the rotation and positioning of arm 26. The movement of actuator 22 causes slider 40 to move radially over top surface 16A of disc 16 and in a path indicated by arrow 42.

Drive controller 30 and actuator 22 operate in a known manner so that the transducing head carried by slider 40 is positioned over the desired location of disc 16. Air current is generated as disc 16 spins, thus creating an aerodynamic surface that supports slider 40. A distance between top surface 16B of disc 16 and slider 40 is typically referred to as a "fly height" of slider 40. Once properly positioned, the transducing head performs a desired read or write operation. For example, read and write signals may be transmitted to the transducing head via conductive traces that extend along actuator 22 to a control device.

Figure 2:
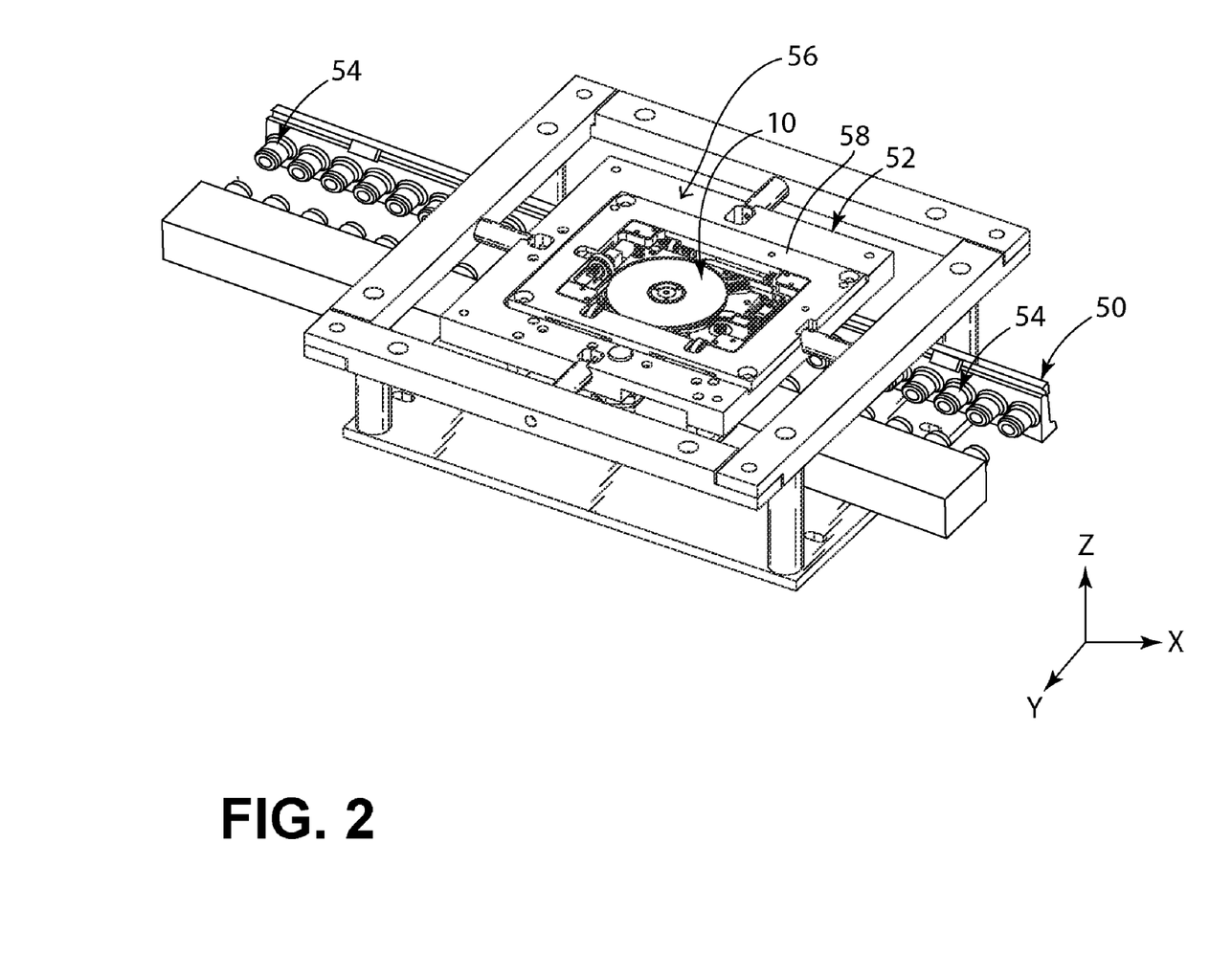
FIG. 2 illustrates an embodiment of a manufacturing system in which a disc drive system is conveyed between assembly stations via a conveyor.

Disc drive systems, such as disc drive system 10, may be manufactured (or "assembled") via fully automated or semi-automated assembly lines (e.g., via a conveyor), whereby disc drive components defining at least a part of a disc drive system are conveyed to various assembly stations of the manufacturing/assembly system. FIG. 2 illustrates an embodiment of a manufacturing system in which disc drive system 10 is conveyed to an assembly station, and in some cases, between different assembly stations via conveyor 50. The disc drive system 10 shown in FIG. 2 may not necessarily include all the components of a complete (e.g., functional) disc drive system 10, but may instead be a partially-completed disc drive system that represents a state of the disc drive system prior to the end of the manufacturing/assembly process.

Fixture assembly 52 is positioned such that conveyor 50 travels under crowder plate 56 and datum plate 58. Disc drive system 10 may be coupled to rollers 54 of conveyor 50, either directly or indirectly (e.g., via a pallet coupled to rollers 54). As rollers 54 of conveyor 50 rotate under the control of a controller (e.g., a computing device), rollers 54, and disc drive system 10 is conveyed between one or more assembly stations. Fixture assembly 52 is configured to position disc drive system 10 or another work piece relative to, e.g., an assembly tool or another device of an assembly station. The controller for conveyor 50 may align disc drive system with fixture assembly 52 and an actuator or another mechanism may lift disc drive system 10 into datum plate 58 at the particular assembly station associated with fixture assembly 52.

At each assembly station, different components may be added to the disc drive and/or different operations may be performed on the assembled components of the disc drive. For example, in some embodiments, fixture assembly 52 may be configured to receive disc drive system 10 and position disc drive system 10 relative to a robotic arm that places a component within disc drive system 10. In one case, for example, as described in further detail below, fixture assembly 52 may help align disc stack assembly 12 with a tool that applied clamp 14 to hub 18.

Due to many factors, such as the force with which a manufacturing tool adds a component to disc drive system 10, external loads may be inadvertently applied to disc drive system 10 during the manufacturing process. For example, in some types of disc stack assemblies 12, when clamp 14 is coupled to hub 18 (FIG. 1), clamp 14 is prestressed with a load applied by a manufacturing tool. As the manufacturing tool brings clamp 14 into contact with hub 18, or as the manufacturing tool releases the load from clamp 14, a load may be applied across clamp 14, hub 18 or other parts of disc stack assembly 12. An example of how disc drive system 10 may react to the release of the prestress load applied to clamp 14 is described below with reference to FIGS. 7A and 7B. The applied load resulting from the manufacturing/assembly process may adversely affect at least some components of disc drive assembly 12, which may be relatively fragile and susceptible to damage from applied loads.

In addition, stresses may be applied to disc drive system 10 as disc drive system 10 is lifted into fixture assembly 52. For example, the acceleration and deceleration of disc drive system 10 as it is lifted into fixture assembly 52 and contacts datum plate 58 may stress one or more components of disc drive system 10. Misalignment between disc drive system 10 and datum plate 58 as disc drive system 10 is lifted into datum plate 58 may also result in stresses to the components of disc drive system 10 (e.g., from inadvertent contact between disc drive system 10 and parts of fixture assembly 52). Together, these manufacturing stresses may adversely affect the components of disc drive system 10, and, in some cases, the performance of the completed disc drive system 10.

Figure 3:
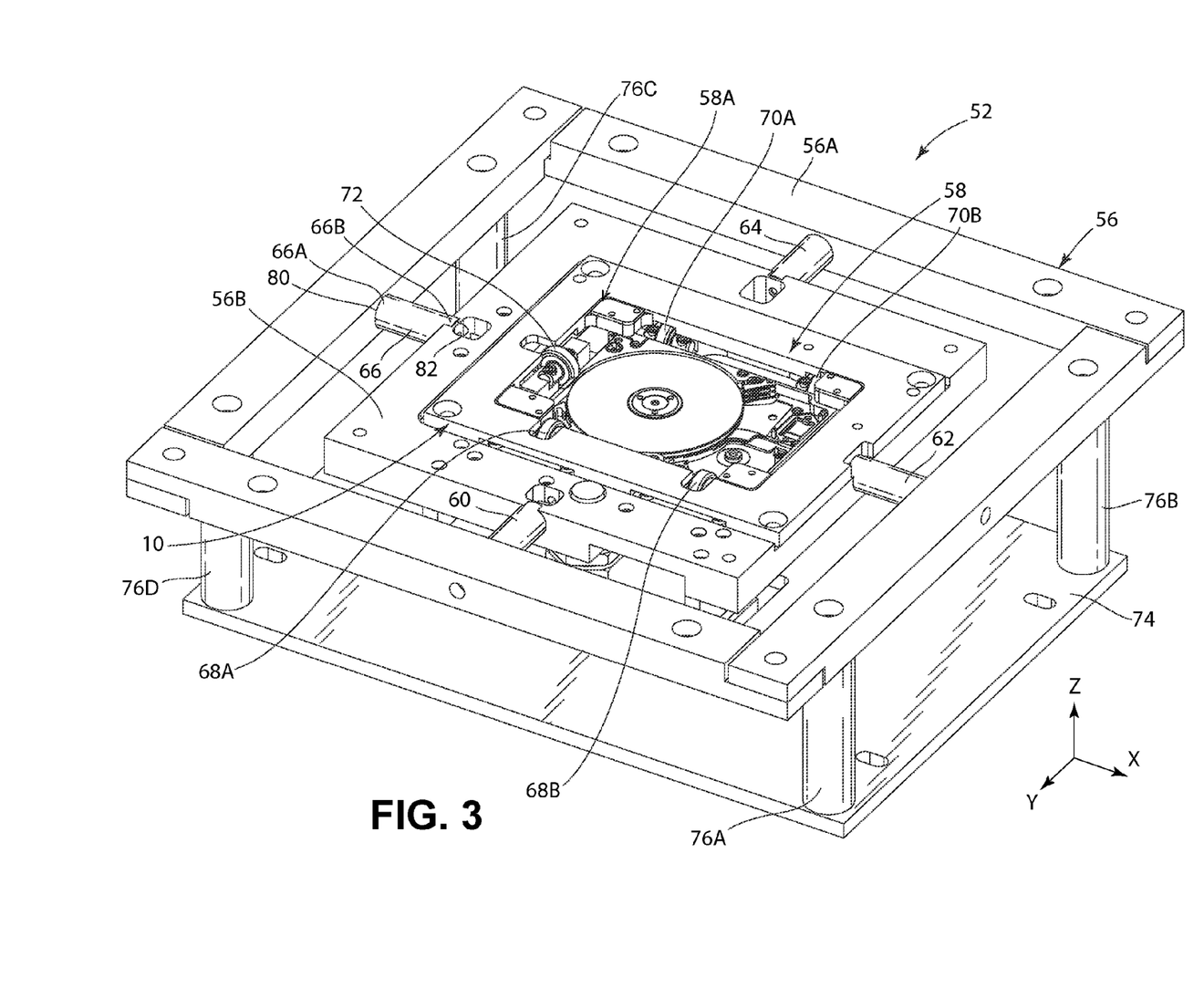
FIG. 3 is a perspective view of an embodiment of a fixture assembly.

Fixture assembly 52, which includes crowder plate 56 and datum plate 58, may help minimize the relative load applied to disc drive system 10 during a manufacturing/assembly process by allowing disc drive system 10 to move in response to the load, while still maintaining a position of disc drive system 10 relative to an assembly station. Crowder plate may help support datum plate 58 relative to an assembly station of a manufacturing/assembly system, while datum plate 58 supports disc drive system 10. In general, fixture assembly 52 may have any suitable configuration that enables disc drive system 10 to move relative to at least a portion of crowder plate 56 when disc drive system 10 is held by fixture assembly 52. In the embodiment shown in FIGS. 2 and 3, second portion 56B (labeled in FIG. 3) of crowder plate 56 is configured to gimbal about a point that substantially aligns with a center of disc stack assembly 12. In addition, second portion 56B of crowder plate 56 is configured to translate in a substantially z-axis direction (orthogonal x-y-z axes are shown in FIGS. 2 and 3). In the embodiment shown in FIG. 2, the z-axis direction is substantially perpendicular to a major surface 58B of datum plate 58.

The movement of disc drive assembly 10 in response to an applied load may help minimize any axial and/or moment loads that are effectively applied to the components of disc drive assembly 10. In addition, because disc drive assembly 10 may gimbal relative to crowder plate 56, a major plane 24A (FIG. 1) of housing 24 of disc drive assembly 10 may remain in a known plane (e.g., the x-y plane) or return to a nominal position, despite any applied loads or despite any orientation of crowder plate 56. In some cases, the gimbaling of disc drive system 10 may also impart multi-directional compliance adjustment for at least a portion of disc drive system 10 relative to an assembly station. As one example, gimbaling of disc drive system 10 may permit disc drive system 10 to rotate in order to match an orientation of a device that is installing a component on disc drive system 10. In this way, the gimbaled mounting of second portion 56B of crowder plate 56 may help increase the tolerance for aligning a manufacturing tool with disc drive system 10.

Figure 4A:
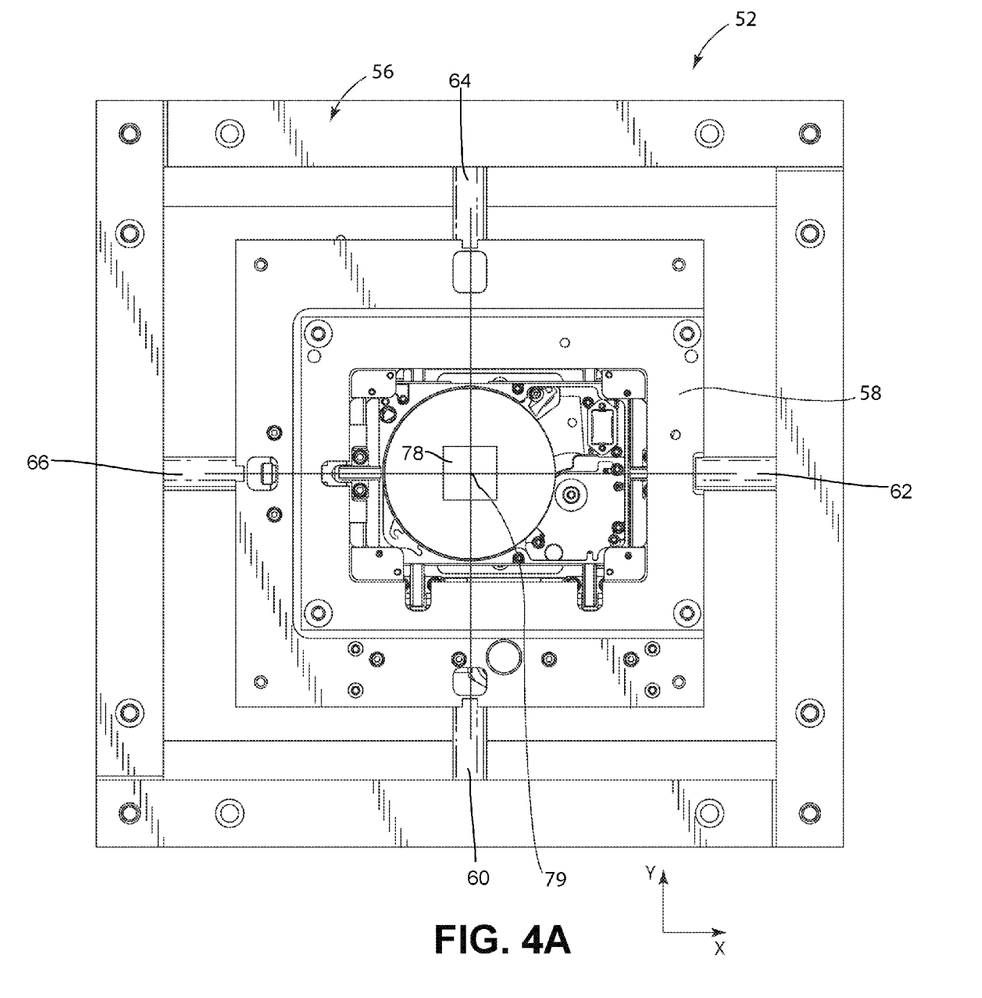
FIGS. 4A and 4B are a plan view and side view, respectively, of the fixture assembly of FIG. 2.
Figure 4B:
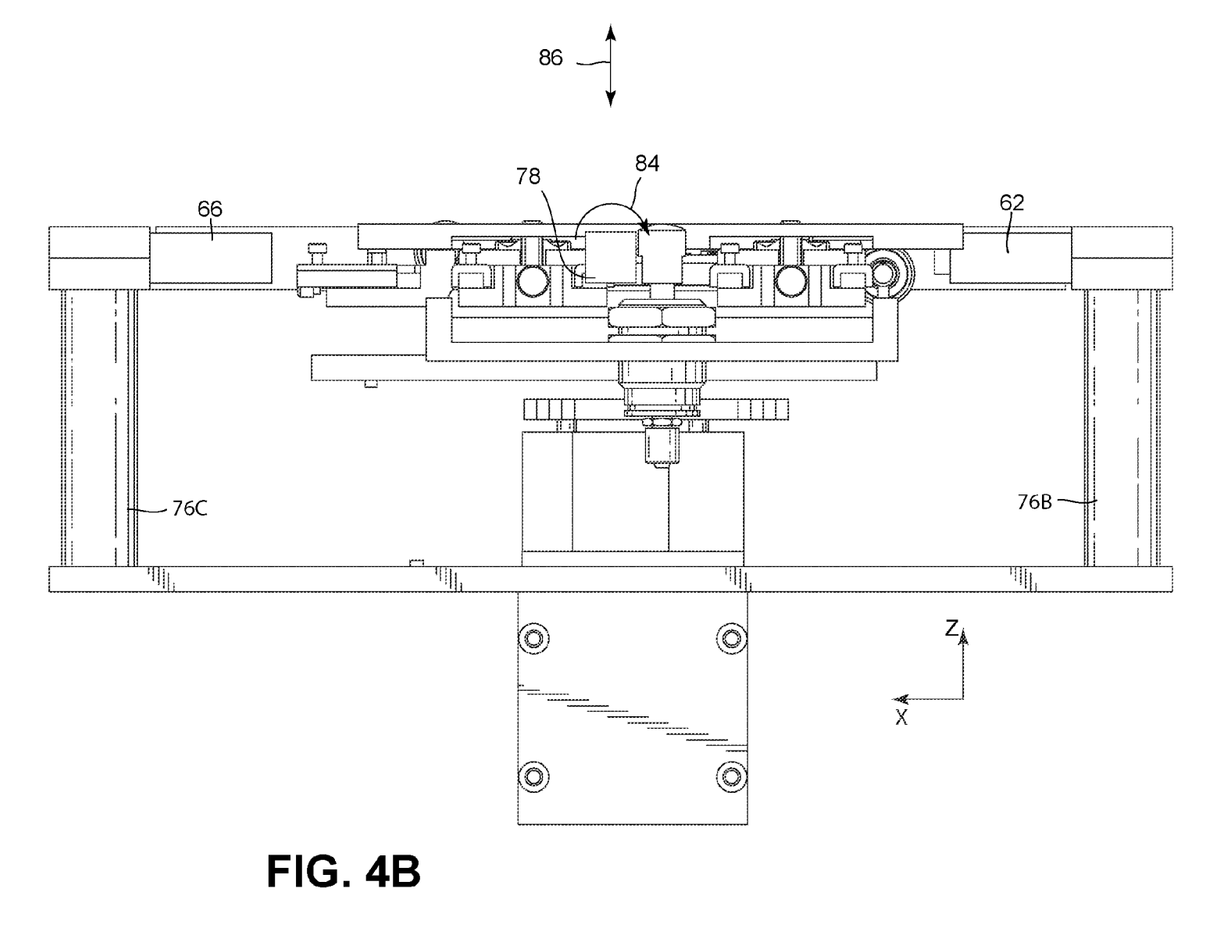

FIG. 3 is a perspective view of the embodiment of fixture assembly 52 shown in FIG. 2, and illustrates disc drive system 10 received within datum plate 58. FIGS. 4A and 4B are a plan view and side view of fixture assembly 52, respectively. Crowder plate 56 and datum plate 58 may be comprised of any suitable material, such as, but not limited to, metal alloys or plastics. For example, in one embodiment, crowder plate 56 is comprised of an aluminum alloy, while datum plate 58 is comprised of stainless steel. The materials for crowder plate 56 and 58, which may be formed of different or the same materials, may be selected based on many factors, such as a manufacturing process with which fixture assembly 52 is used. If the manufacturing process includes elevated temperatures or a wide variation in temperature, it may be desirable to select the materials for crowder plate 56 and/or datum plate 58 such that the coefficient of thermal expansion is minimized. As another example, it may be desirable for crowder plate 56 and/or datum plate 58 to be comprised of a material that hard enough to withstand the impact of various tools used during a manufacturing process.

Crowder plate 56 includes first portion 56A and second portion 56B, which are coupled by support members 60, 62, 64, and 66. Support members 60, 62, 64, and 66 may be integral with or separate from first portion 56A of crowder plate, second portion 56B or both. Although four support members are shown in the embodiment of FIGS. 1 and 2, in other embodiments, fixture assembly 52 may include any suitable number of support members, such as two, three or more than four.

Datum plate 58, which is configured to receive disc drive system 10, is coupled to crowder plate 56 via any suitable technique (e.g., one or more screws, an adhesive, welding, etc.) and is configured to gimbal relative to first portion 56A of crowder plate 56 and configured for translational movement substantially along the z-axis direction. As a result of the ability of datum plate 58 to gimbal and translate, disc drive system 10 is not rigidly fixed within fixture assembly 52 when disc drive system 10 is supported by datum plate 58. When a load is applied to disc drive system 10 while disc drive system 10 is mounted within datum plate 58 or otherwise coupled thereto, second portion 56B of crowder plate 56, along with datum plate 58 and disc drive system 10 are able to move in response to the applied force, while second portion 56A of crowder plate 56 substantially maintains its position. On the other hand, disc drive system 10 may not be able to react to the applied loads if datum plate 58 was rigidly fixed to datum plate 58, and, as a result, the components of disc drive system 10 may absorb a greater load. The greater absorbed load may adversely affect one or more components of disc drive system 10. Because crowder plate 56 remains substantially in place despite any applied loads, crowder plate 56 may help maintain alignment between disc drive system 10 and an assembly station.

Datum plate 58 is coupled to second portion 56B of crowder plate 56 using any suitable mechanism, such as an adhesive, welding, screws, or other fixation mechanisms. In the embodiment shown in FIG. 3, datum plate 58 is rigidly fixed to second portion 56B of crowder plate 56. In other embodiments, crowder plate 56 may include a portion that allows datum plate 58 to gimbal and translate relative to crowder plate 56, rather than moving with a portion 56B of crowder plate 56 as in the embodiment shown in FIG. 3. For example, the entire crowder plate 56 may remain stationary and datum plate 58 may gimbal and translate in a substantially z-axis direction relative to crowder plate 56.

Disc drive system 10 may be introduced into opening 58A defined by datum plate 58 via any suitable mechanism, such as a mechanical arm (e.g., an actuator arm) that lifts disc drive system 10 into opening 58A. Datum plate 58 includes substantially rigidly-fixed wheels 68A and 68B, and spring-loaded wheels 70A and 70B on an opposite side of datum plate 58. Spring-loaded wheels 70A and 70B are biased towards wheels 68A, 68B. As disc drive system 10 is lifted into opening 58A, wheels 70A and 70B engage housing 24 of disc drive system 10, and push housing 24 into engagement with wheels 68A and 68B. In this way, wheels 68A, 68B, 70A, and 70B help affix disc drive system 10 substantially along the x-y plane at a location that is substantially repeatable for multiple disc drives 10 of substantially the same size. In some embodiments, datum plate 58 may include spring-loaded wheel 72, which is biased away from datum plate 58, and an opposing substantially rigidly-fixed wheel (not shown in FIG. 2 or 3). Spring-loaded wheel 72 and the opposing substantially rigidly-fixed wheel may also engage with housing 24 of disc drive system 10 and help align disc drive system 10 along the x-y plane as disc drive system 10 is introduced into opening 58A.

Support members 60, 62, 64, and 66 are coupled to first and second portions 56A, 56B of crowder plate 56 using any suitable mechanism, such as an adhesive, welding or a another mechanical coupling technique. In the embodiment shown in FIGS. 2-4B, first and second portions 56A, 56B of crowder plate 56 define openings for receiving support members 60, 62, 64, and 66. For example, first end 66A of support member 66 is received within opening 80 defined by first portion 56A of crowder plate 56, while an opposite end 66B of support member 66 is received within a corresponding opening 82 defined by second portion 56B. In an alternate embodiment, first portion 56A of crowder plate 56 may be directly coupled to datum plate 58, rather than being coupled to datum plate 58 via second portion 56B. In general, support members 60, 62, 64, and 66 may be any suitable size, which may depend upon the work piece datum plate 58 is configured to hold.

FIGS. 4A and 4B illustrate the alignment of support members 60, 62, 64, and 66 relative to spindle motor 78 (schematically shown in FIGS. 4A and 4B) of disc drive system 10. A center of each support member 60, 62, 64, and 66 is aligned with the center of the other support members, such that the center of support members 60, 62, 64, and 66 intersect with a top (measured along the z-axis direction) and center (measured along the x-y plane) of motor 78, at point 79. In this way, spindle FIG. 7 may gimbal about point 79, which is substantially aligned with a center of the spindle motor 78 of disc drive system 10. In the embodiment shown in FIGS. 4A and 4B, center 79 of spindle motor 78 is also substantially aligned with a center of disc stack assembly 12 (FIG. 1).

Spindle motor may be relatively susceptible to damage from axial and moment loads compared to other components of disc drive system 10, and accordingly, it may be desirable to allow disc drive system 10 to gimbal about spindle motor 78. However, in other embodiments, fixture assembly 52 may be designed to gimbal about another point, which may be selected based on the work piece supported by fixture assembly 52 (e.g., another type of data storage and retrieval system), the manufacturing loads because different manufacturing processes may impart different forces on disc drive assembly 10, and so forth.

Support members 60, 62, 64, and 66 comprise any suitable material, such as, but not limited to, a metal, metal alloy, plastic, elastomeric material, combinations thereof, or any other suitable material(s), that enables support members 60, 62, 64, and 66 to flex in at least one direction and permit controlled (e.g., limited) gimbaling of disc drive 10 about point 79, as indicated by arrow 84 in FIG. 4B, and movement of disc drive 10 along the z-axis direction, as indicated by arrow 86 in FIG. 4B. As one example, support members 60, 62, 64, and 66 may be shear pads, as described in further detail below. In the embodiment of disc drive system 10 shown in FIGS. 1 and 2, center portion 21 of hub 20 also substantially aligns with point 79, and accordingly, support members 60, 62, 64, and 66 are configured to allow disc drive system 10 to rotate about center portion 21 of hub 20. In cases in which hub 20 or motor 78 are not yet assembled onto disc drive system 10, support members 60, 62, 64, and 66 are configured to allow assembled components of disc drive system 10 to rotate about an axis that substantially aligns with the expected center 79 of spindle motor 78.

Support members 60, 62, 64, and 66 substantially resist compression (i.e., movement between first and second portions 56A, 56B of crowder plate 56), but are configured to flex in the z-axis direction. In the embodiment of fixture assembly 52 shown in FIGS. 2-4B, the four support members 60, 62, 64, and 66 that substantially resist compression help prevent second portion 56B of crowder plate 56, and, therefore, datum plate 58 and disc drive system 10, from moving along the x-axis or y-axis directions. In some cases, it may be desirable for datum plate 58 to maintain x and y-axis locations in order to maintain alignment with an assembly tool, such as the clamp installation tool shown and described below with reference to FIGS. 7A and 7B.

Support members 60, 62, 64, and 66 are configured for rotational movement in order to allow disc drive assembly 10 to gimbal. In other words, support members 60, 62, 64, and 66 are configured to enable datum plate 58 to maintain a location along the x-axis and y-axis, while allowing datum plate 58 to move in the z-axis direction and pivot about point 79. In some embodiments, support members 60, 62, 64, and 66 are configured to return to a predetermined configuration, such that upon reacting to a particular load, second portion 56B of crowder plate 56 returns to a predetermined and predictable position (i.e., a "nominal" position) relative to first portion 56A of crowder plate 56. By ensuring that second portion 56B of crowder plate 56 and datum plate 58 returns to a known position, a control system may position datum plate 58 relative to an assembly station with substantially accuracy and precision.

Support members 60, 62, 64, and 66 may be configured and arranged relative to crowder plate 56 such that datum plate 58 is a compliant center of fixture assembly 52, or such that a portion of disc drive assembly 10 (e.g., spindle motor 78) is a compliant center when disc drive assembly 10 is received in datum plate 58. When an external force acts an object and the force passes through a compliant center, the object only translates in a direction of the external force and typically does not rotate. When a moment acts on the compliant center, the object rotates about the compliant center and typically does not translate.

In some embodiments, support members 60, 62, 64, and 66 may comprise a resilient and deformable material interposed by rigid spacer plates. For example, support members 60, 62, 64, and 66 may each be an elastic shear pad, which may include, for example, a plurality of stacked metal washers, shims, or the like, enclosed in a casing that is at least partially flexible (e.g., a rubber casing). In another embodiment, support members 60, 62, 64, and 66 may each be a shear pad including a plurality of metal shims separated by an elastomeric material, such as rubber. Shear pads typically provide lateral compliance (i.e., along the z-axis direction when shear pads are oriented as support members 60, 62, 64, and 66 are shown in FIGS. 3-4B), as well as axial compliance (i.e., compliance about the z-axis).

Examples of suitable shear pads include those available from ATI Industrial Automation of Apex, N.C. ATI Industrial Automation provides shear pads having a lateral stiffness in a range of about 1.05 kiloNewtons/meter (about 6 pounds/inch)

to about 5.95 kiloNewtons/meter (about 34 pounds/inch), and an axial stiffness in a range of about 407.85 kiloNewtons/meter (about 2329 pounds/inch) to about 4358.51 kiloNewtons/meter (about 24,889 pounds/inch).

In other embodiments, support members 60, 62, 64, and 66 may comprise a compression spring or a machined spring (e.g., a helical coupling between first and second portions 56A and 56B of crowder plate 56). Examples of suitable springs include the Heli-Cal Flexure, available from Helical Products Company, Inc. of Santa Maria, Calif. A machined spring may include a flexible beam machined from a single piece of material in a generally helical shape. The spring may be machined to achieve specific elastic performance in compression, extension, torsion, lateral stiffness, and lateral displacement.

Figure 5:
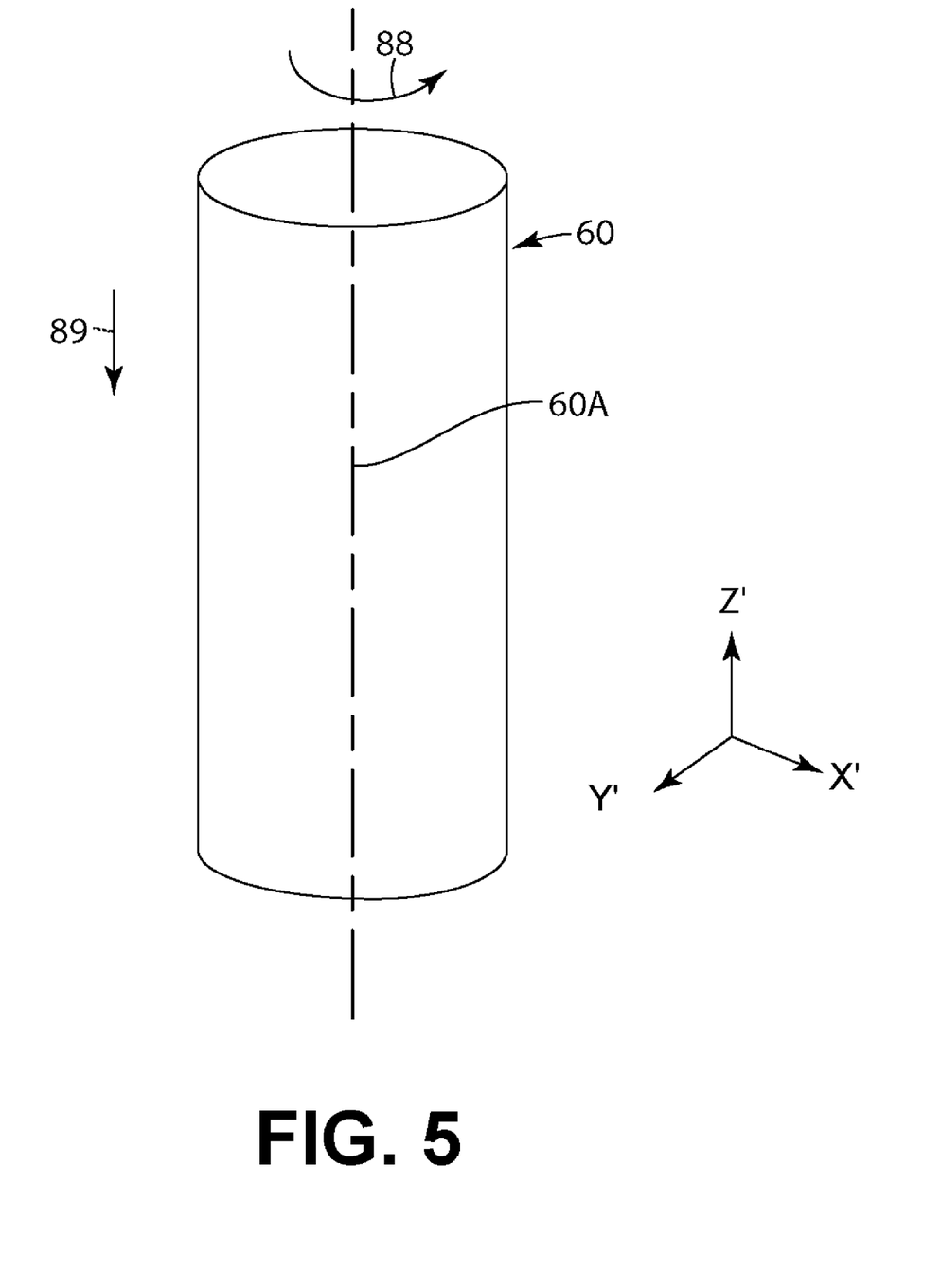
FIG. 5 is a schematic illustration of a support member of the fixture assembly of FIG. 3.

FIG. 5 is a schematic drawing of support member 60, which is also representative of support members 62, 64, and 66. Support member 60 is configured to rotate about center longitudinal axis 60A, as indicated by arrow 88. Support member 60 is configured to be flexible along a plurality of directions other than along the negative z' axis, where orthogonal x', y', and z' axes are shown in FIG. 5. The x', y', and z' axes are different than the x, y, and z axes shown in FIGS. 1 and 2, and are specific to support member 60. The negative z'-axis direction indicates a direction in which a compressive force would be applied to support member 60. Accordingly, support member 60 is configured to substantially resist compression along center axis 60A, where a direction of compression is indicated by arrow 89. In other embodiments, support members 60, 62, 64, and 66 may have different properties.

Returning now to FIG. 3, fixture assembly 52 may also include platform 74 and legs 76A, 76B, 76C, and 76D. Legs 76A-D may be integral with or attached to platform 74 or crowder plate 56. In the embodiment shown in FIG. 3, legs 76A-D are coupled to first portion 56A of crowder plate 56. In some embodiments, legs 76A-D are substantially rigid, while in other embodiments, legs 76A-D are configured to allow crowder plate 56 to translate along the x-y plane upon the application of a substantially shear force to crowder plate 56. The shear force may be attributable to a manufacturing process, such as when clamp 14 is rotated into engagement with hub 18 (FIG. 1), as described in further detail below.

Legs 76A-D may be, for example, substantially similar to support members 60, 62, 64, and 66 (e.g., shear pads). By enabling crowder plate 56 to move along the x-y plane, flexible legs 76A-D may help fixture assembly 52 react to the application of a substantially shear force and reduce the impact to the components of disc drive system 10 from shear loads attributable to a manufacturing process. The reduction in the impact of external forces may help minimize damage to components of disc drive system 10 that may otherwise result if disc drive system 10 was unable to move in response to the shear load.

Substantially accurate and precise x-axis and y-axis positioning of disc drive system 10 during a manufacturing process may be desirable. Thus, legs 76A-D may be configured to return to a predetermined, nominal position after flexing in response to a shear force resulting from the manufacturing process in order to maintain the x-axis and y-axis position of datum plate 56 for a subsequent assembly station. That is, deviation of datum plate 56 from the desired x-axis and y-axis position after the application of a shear force does not necessarily result in a datum plate 56 positioning error for a subsequent assembly station.

In other embodiments, any suitable number of legs 76A-D may couple crowder plate 56 to platform 74. Legs 76A-D may permit movement of datum plate 56 substantially along the x-y plane in embodiments in which datum plate 56 is coupled to crowder plate 54 via support members 60, 62, 64, and 66, as well as in embodiments in which datum plate 56 is configured to remain substantially stationary relative to crowder plate 54.

As previously described, disc drive system 10 includes an interlocking clamp 14 and hub 18. In one embodiment, fixture assembly 52 is useful for a manufacturing/assembly process in which clamp 14 is assembled on hub 18 because movement of datum plate 56 relative to crowder plate 54 of fixture assembly 52 may help counteract the forces on disc drive system 10 that result when a prestress load is released from clamp 14 and clamp 14 is brought into engagement with hub 18. In other embodiments, however, fixture assembly 52 is useful for other types of disc drive systems 10, including those without an interlocking clamp 14 and hub 18, or other work pieces to which components are assembled.

Figure 6:
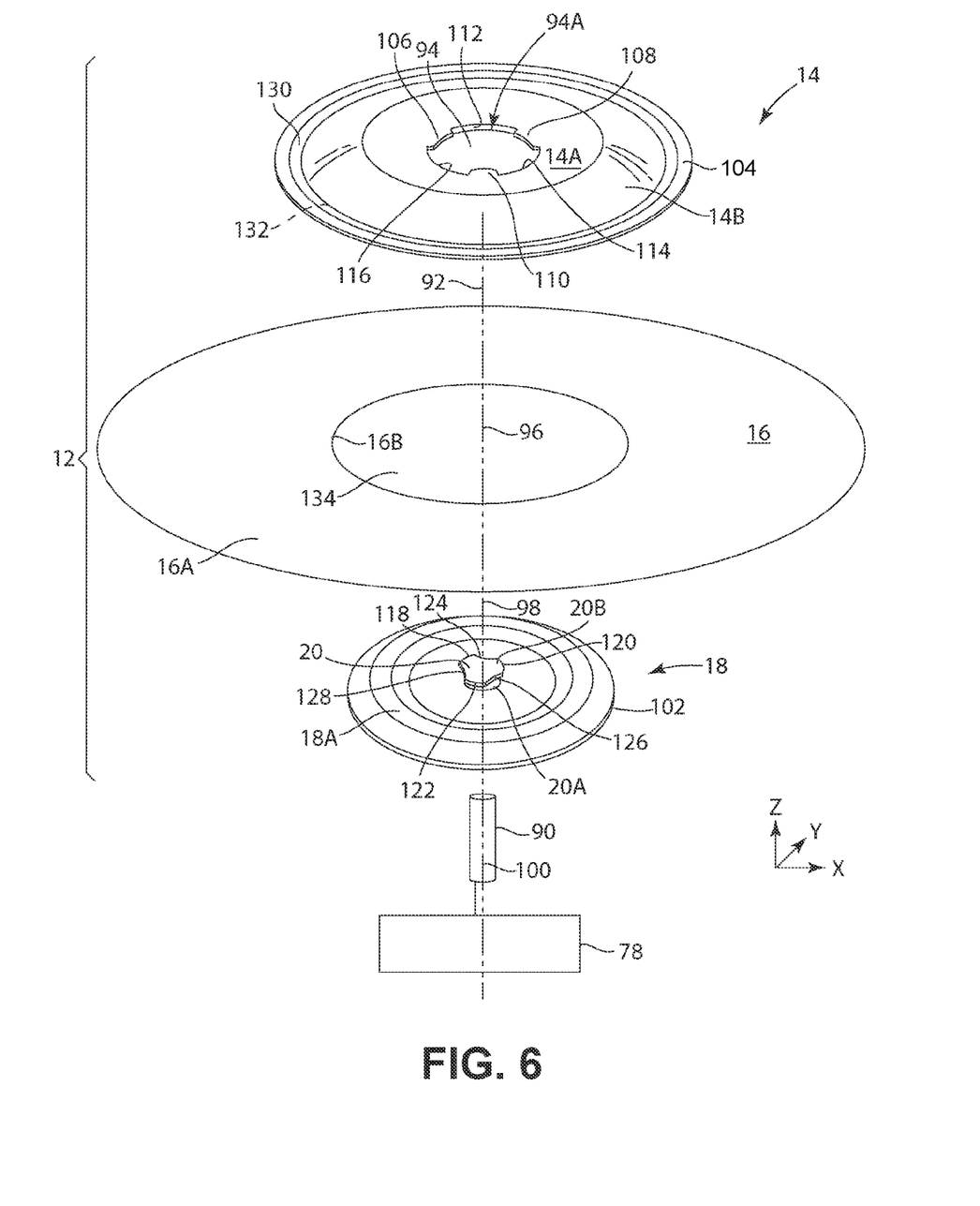
FIG. 6 is an exploded perspective view of the disc stack assembly of the disc drive system of FIG. 1.

FIG. 6 is an exploded perspective view of disc stack assembly 12 of disc drive system 10 of FIG. 1, which includes clamp 14, disc 16, and hub 18. Disc drive system 10 including clamp 14 and hub 18 are described in further detail in commonly-assigned U.S. patent application Ser. No. 11/734,450, filed on Apr. 12, 2007, the entire content of which was previously incorporated by reference. Fixture assembly 52 may also be useful for a process of manufacturing the other embodiments of disc stack assemblies including interlocking hubs and clamps that are described in U.S. patent application Ser. No. 11/734,450.

While one disc 16 is shown in FIG. 6, in other embodiments, disc stack assembly 12 may include any suitable number of discs (or another types of magnetic media), which may be, for example, separated by a spacer. Clamp 14, disc 16, and hub 18 are not necessarily shown in proper scale relative to each other. Rather, the relative proportions of clamp 14, disc 16, and hub 18 may depend upon the type of disc drive system 10 into which disc stack assembly 12 is incorporated. FIG. 6 also schematically illustrates shaft 90 coupled to spindle motor 78. Center axis 92 of clamp aperture 94, disc 16 axis of rotation 96, center axis 98 of hub 18, and shaft 90 axis of rotation 100 are substantially aligned, such that shaft 90 is received in protrusion portion 20 of hub 18, inner surface 16B of disc 16 is disposed around cylindrical surface 102 of hub 18, and clamp aperture 94 receives protrusion portion 20 of hub 18.

Clamp body 14A of clamp 14 defines clamp aperture 94, which is configured to receive and engage with protrusion portion 20 of hub 18. Clamp 14 also includes outer flange 104 and clamp flanges 106, 108, and 110, which radially extend into clamp aperture 94. In the embodiment shown in FIG. 6, clamp flanges 106, 108, and 110 are substantially perpendicular to center axis 92 of clamp aperture 94. In alternate embodiments, clamp 14 may include any suitable number of flanges of any suitable size and oriented at any suitable angle with respect to center axis 92 of clamp aperture 94. Because flanges 106, 108, and 110 do not extend around the entire inner perimeter 94A of clamp aperture 94, void areas 112, 114, and 116 are defined between adjacent clamp flanges 106, 108, and 110.

Hub 18 includes hub body 18A, protrusion portion 20 extending from body portion 18A and cylindrical surface 102. Protrusion portion 20 of hub 18 further includes stem 20A and flange platform 20B. Hub flanges 118, 120, and 122 extend from flange platform 20B, which may or may not be integral therewith. Flanges 118, 120, and 122 define a plurality of void areas 124, 126, and 128. Shaft 90 is aligned to extend into and engage with stem 20A of protrusion portion 20 of hub 18. In the embodiment shown in FIG. 6, hub 18 is symmetrical about center axis 98. In other embodiments, hub 18 may be asymmetrical about center axis 98, depending on the type of rotation desired for hub 18 and/or disc stack assembly 12.

During assembly of disc stack assembly 12, center axis 92 of clamp 14 aligns with center axis 96 of rotation of discs 16 and 17, which aligns with protrusion portion 20 of hub 18 and shaft 90 of disc drive system 10. While in the embodiment shown in FIG. 6, aperture 94 is centered with respect to clamp body 14A (and therefore symmetric about center axis 92 of clamp aperture 94), in some embodiments, clamp aperture 94 may be offset relative clamp body 14A in order to create eccentric rotation of clamp 14 relative to center axis 96 of rotation of disc 16.

When disc stack assembly 12 is assembled, clamp flanges 106, 108, and 110 extending from clamp body 14A engage with hub flanges 118, 120, and 122, respectively, extending from flange platform 20B of hub 18, such that clamp 14 and hub 18 are "locked" together without external hardware or adhesives. Clamp flanges 106, 108, and 110 and hub flanges 118, 120, and 122 are sized in operative relation to one another. For example, in one embodiment, clamp flanges 106, 108, and 110 are the same size as hub flanges 118, 120, and 122. In another embodiment, clamp flanges 106, 108, and 110 and hub flanges 118, 120, and 122 are different sizes but sized such that clamp flanges 106, 108, and 110 and hub flanges 118, 120, and 122 may still engage with each other.

Clamp flange 106 and respective hub flange 118 have similar cross-sectional contours, and as a result, a surface of clamp flange 106 is configured to abut a surface of hub flange 118. Similarly, clamp flange 108 is configured to abut a surface of hub flange 120, and clamp flange 110 is configured to abut a surface of hub flange 122. When clamp 14 and hub 18 are locked together, clamp 14 is discouraged from moving in a z-axis direction (orthogonal x-y-z axes are shown in FIG. 6), which substantially fixes the z-axis position of disc 16 between clamp 14 and hub 18.

Annular indentation 130 in clamp body 14A near outer perimeter 14B of clamp body 14A defines contact surface 132 (shown in phantom lines) for positively engaging with disc 16 when disc stack assembly 12 is assembled. In addition, clamp body 14A defines outer flange 104, which provides a feature for handling clamp 14 during a manufacturing process for assembling disc stack assembly 12. In alternate embodiments, contact surface 132 may be otherwise defined by clamp body 14A (e.g., with a plurality of notches formed in clamp body 14A rather than annular indentation 130). Inner surface 16B of disc 16 defines disc aperture 134. Disc aperture 134 is configured to fit around cylindrical surface 102 of hub 18.

Figure 7A:
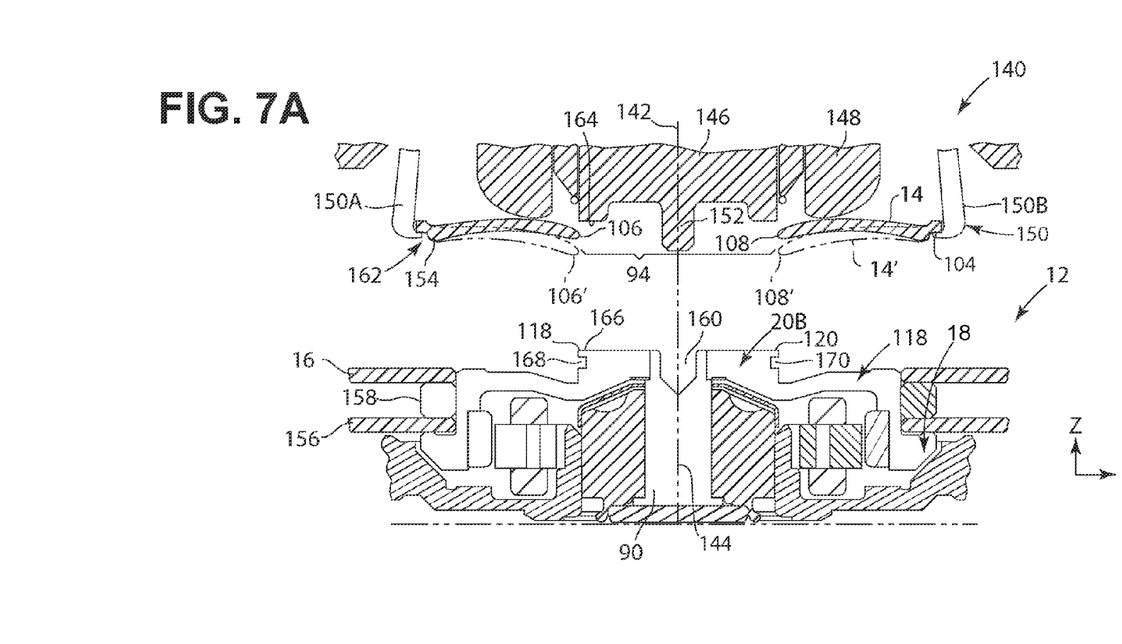
FIG. 7A is a cross-sectional view of the installation tool and disc stack assembly of FIG. 6.
Figure 7B:
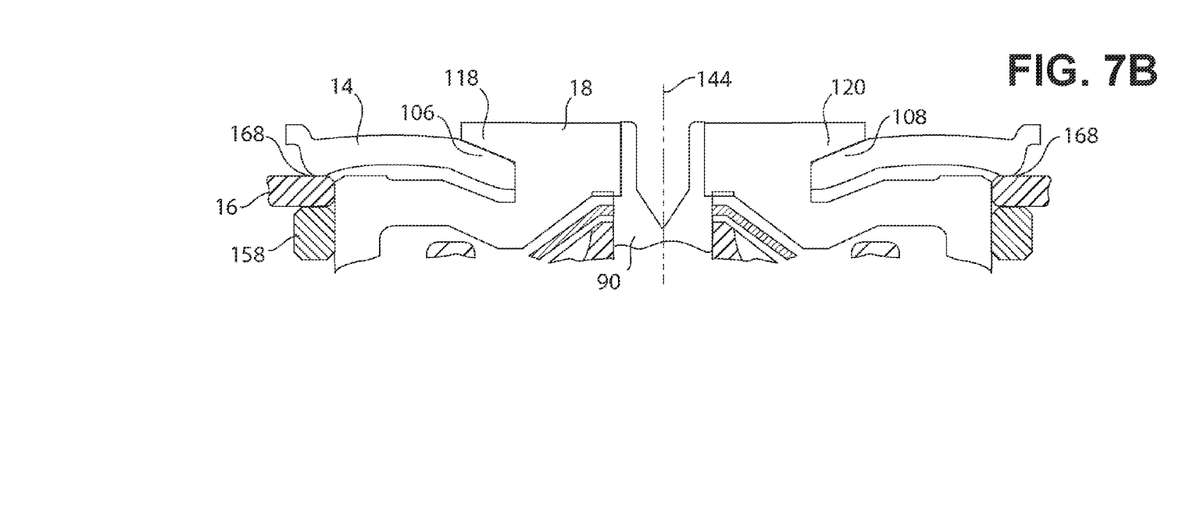
FIG. 7B is a cross-sectional view of an assembled disc stack assembly, after the installation tool has attached the clamp to the disc and hub stack and released the load from the clamp.

FIG. 7A shows a cross-sectional view of installation tool 140 (partially shown) aligned with disc stack assembly 12 (partially shown), and illustrates a preloading of clamp 14. Installation tool 140 may be present at one of many assembly stations for manufacturing disc drive system 10. Disc stack assembly 12 may be moved to the assembly station of installation tool 140 via conveyor 50. In FIGS. 7A and 7B, disc stack assembly 12 is supported within datum plate 58, which is supported by second portion 56B of crowder plate 56.

As previously described, disc drive assembly 10 may be coupled to rollers 54 of conveyor 50, which may be controlled via a computing device. As rollers 54 rotate, disc drive assembly 10, and accordingly, disc stack assembly 12, is moved to the assembly station at which installation tool 140 is located. The computing device or other control system of operating conveyor 50 substantially positions fixture assembly 52 relative to installation tool 140 such that tool 140 is substantially aligned with disc stack assembly 12. That is, fixture assembly 52 is positioned relative to installation tool 52 such that center longitudinal axis 142 of installation tool 140 is substantially coincident with center axis 144 of disc stack assembly 12. In a substantially unflexed state, support members 60, 62, 64, and 66 couple datum plate 58 to crowder plate 56 in a predetermined position, such that the control system for operating conveyor 50 may substantially accurately and precisely position fixture assembly 52 relative to installation tool 140, despite any previous deflections exhibited by support members 60, 62, 64, and 66.

Installation tool 140 includes inner portion 146, intermediate portion 148, outer portion 150, and alignment member 152. Also shown in FIG. 7A are clamp aperture 94, disc contact surface 154, clamp flanges 106, 108, and 110, and outer flange 104, and hub 18, which includes hub flanges 118, 120, and 122 extending from flange platform 20B. In the embodiment shown in FIG. 7A, disc stack assembly 12 includes two discs 16 and 156, which are separated by spacer 158. Shaft 90 is rotationally coupled to spindle motor 78 (shown in FIG. 6).

Shaft 90 defines cavity 160, which is configured to receive alignment member 152 of installation tool 140. Alignment member 152 is sized for insertion into cavity 160 of shaft 90 in order to help align installation tool 140 with disc stack assembly 12. Fixture assembly 52 enables disc stack assembly 12 to gimbal relative to installation tool 140, which may help customize the alignment of a particular disc drive assembly 12 to a particular installation tool 140. Rather than rigidly fixing disc drive assembly 12 within fixture assembly 52, which may make it difficult for cavity 160 of shaft 90 to receive alignment member 152, shaft 90 may gimbal and adapt to various positions relative to alignment member 152 of tool 140. This helps increase the possibility that alignment member 152 of tool 140 will properly mate with cavity 160 of shaft 90.

Outer portion 150 is spaced radially outwardly from inner portion 146 and includes multiple sections that are movable in a z-axis direction. In particular, outer portion 150 includes portions that engage and release clamp 14, as shown in FIG. 7A. Portions 150A and 150B of outer portion 150 are movable in an x-axis direction (i.e., an axial direction) to apply a first preload force in a positive z-axis direction proximate to an outer edge of clamp 18. A portion of outer portion 150 of tool 140 and a portion of outer flange 104 of clamp 14 share a cross-sectional profile, as shown in region 162, enabling outer portion 150 to engage with and grasp clamp 14.

Intermediate portion 148 is spaced radially inward (i.e., along the y-axis direction) from outer portion 150 and is movable in a negative z-axis direction relative to inner portion 146 of installation tool to supply a second preload force to clamp flanges 106, 108, and 110 in a direction towards hub 18. In particular, intermediate portion 148 prestresses clamp 14 by applying a substantially axial load onto clamp flanges 106, 108, and 110, thereby deflecting clamp flanges 106, 108, and 110 in the negative z-axis direction, resulting in prestressed clamp 14'. In reaction to the deflection of clamp flanges 106, 108, and 110 in the negative z-axis direction, outer flange 104 of clamp 14 deflects in the positive z-axis direction. In some embodiments, outer portion 150 may also purposefully apply a load to deflect outer flange 104 in the positive z-axis direction. As described in U.S. patent application Ser. No. 11/734,450, which was previously incorporated by reference, selection of the load that intermediate portion 148 applies to clamp flanges 106, 108, and 110 depends upon many factors, including, but not limited to, the number and size of discs in disc stack assembly 12, the speed at which the discs will spin during operation of a disc drive incorporating stack 12, a thickness of clamp flanges 106, 108, and 110, and a thickness of hub flanges 118, 120, and 122.

Installation tool 140 advances prestressed clamp 14' toward the remainder of disc stack assembly 12 while prestressed clamp 14' is in a first rotational orientation. Installation tool 140 advances prestressed clamp 14' until surface 164 of installation tool 140 contacts hub 18. Introducing alignment member 152 of installation tool 140 into cavity 160 of shaft 90 helps center installation tool 140 with respect to hub 18. Flange platform 18B is then introduced into clamp aperture 94. Installation tool 140 may rotate clamp 14 into a second rotational orientation such that clamp flanges 106, 108, and 110 fit within grooves 168 and 170, respectively, formed between hub flanges 118, 120, and 122, respectively. Clamp 14 preferably does not contact disc 16 when clamp 14 is rotated in order to prevent damaging disc 16 as clamp 14 is rotated. During this rotation of clamp 14, flexible legs 76A-D of fixture assembly 52 may help disc stack assembly 12 react to the rotational force by allowing crowder plate 56, datum plate 58, and disc drive system 10 flexibility in the x-axis direction and y-axis direction.

Once intermediate portion 148 of installation tool 140 removes the prestressing load from clamp 14, clamp flanges 106, 108, and 110 deflect in a positive z-axis direction and are drawn into engagement with hub flanges 118, 120, and 122 (as shown in FIG. 7B) because clamp flanges 118, 120, and 122 are predisposed to return to their original (nondeflected) position. In one embodiment, prestressed clamp 14' is unloaded in at least two steps. In a first step, intermediate portion 148 releases clamp flanges 106, 108, and 110, thereby drawing clamp flanges 106, 108, and 110 into engagement with hub flanges 118, 120, and 122, respectively. In a second step, outer portion 150A, 150B releases outer flange 104 of clamp 14, such that disc contact surface 168 of clamp 14 is lowered into contact with disc 16. By releasing the load from prestressed clamp 14' in these two steps, the relative movement between clamp 14 and disc 16 is reduced because disc contact surface 168 contacts disc 16 at or near a final contact location on disc 16. Because most or all of the deflection is removed from clamp 14 prior to disc contact surface 168 contacting disc 16, the possibility of damage to disc 16 may be reduced. If the load is released in one step, clamp 14 may move relative to disc 16 as clamp 14 returns to its original, unstressed state, which may be undesirable.

When installation tool 140 releases the load from prestressed clamp 14', clamp 14 may be inclined to move in a positive z-axis direction, toward installation tool 140, in response to the release of the load. If disc stack assembly 12 (or fewer or greater components of disc drive system 10) was mounted in datum plate 58 that was rigidly fixed to crowder plate 56, disc stack assembly 12 may be unable to respond to the load removal. In contrast, when disc stack assembly 12 is held by datum plate 58 that is configured to translate in the z-axis direction and gimbal relative to crowder plate 56, disc stack assembly 12 may move in order to compensate for at least some of the impact from the release of the load from clamp flanges 106, 108, and 110.

Similarly, when the intermediate portion 148 of tool 140 releases the load from clamp 14 or outer portion 150A, 150B releases the load from outer flange 104 of clamp 14, the remainder of disc drive system 10 may have a tendency to tilt in response to the withdrawal of the load from clamp 14. Gimbaling datum plate 58 helps limit residual or axial loads through the disc drive system 10 (e.g., through actuator motor 78) attributable to the withdrawal of the load from clamp 14.

In addition, when installation tool 140 aligns clamp aperture 94 over hub flange platform 18B, clamp 14 may inadvertently or purposefully contact hub 18. Similarly, when disc contact surface 168 of clamp 14 is drawn into engagement with disc 16, a force may be inadvertently applied to disc 16. The impact from the contact between clamp 14 and hub 18 and/or the contact between clamp 14 and disc 16 may also result in more internalized stresses or vibrations within disc stack assembly 12 if datum plate 58 was rigidly fixed to second portion 56B of crowder plate 56 compared to an arrangement in which datum plate 58 is coupled for rotational and translational movement relative to second portion 56B of crowder plate 56. Movement of datum plate 58 may help minimize any resulting impact to the components of disc stack assembly 12, as well as any other assembled components of disc drive system 10, where the impact is attributable to the contact between clamp 14 and hub 18 and/or clamp 14 and disc 16.

Once clamp flanges 106, 108, and 110 and hub flanges 118, 120, and 122, respectively, are engaged, discs 16 and 156 are securely fixed to hub 18, and additional hardware or an adhesive are not necessarily required to fix clamp 14 to hub 18. Thus, an additional step is not necessary to securely attach clamp 14 to hub 18. In some cases, additional hardware or an adhesive may be used.

In some embodiments, it may be desirable to center clamp 14 relative to hub 18 in order to help disc stack assembly 12 maintain better balance as disc 16 spins, thereby improving performance of disc drive assembly 10. When clamp 14 is coupled to hub 18, assembly tool 140 may center clamp 14 relative to hub 18, or, in some cases, clamp 14 may be self-centering. For example, clamp 14 may include a feature (e.g., a tab) that mates up with a feature of hub 18 (e.g., another groove) to help center clamp 14. In these cases, clamp 14 may have a tendency to shift the drive in the x-y plane after clamp 14 is released from assembly tool 140 in order to fine the centered position. In some embodiments, when clamp 14 is self-centering, it may be desirable for disc stack assembly 12 to move along the x-y plane, e.g., via flexible legs 76A-D that couple crowder plate 56 to platform 74, as described above. If disc drive system 10 held rigidly in the x-y plane, a side load and moment will be exerted on the motor hub as clamp 14 centers itself with respect to hub 18, which may damage hub 18 or other components of disc drive system 10. On the other hand, of movement of disc drive system 10 along the x-y plane is permitted by the flexible legs 76A-D, the side load or moment applied to hub 18 as clamp 14 centers itself may be minimized.

FIG. 7B illustrates assembled disc stack assembly 12. Clamp flanges 106, 108, and 110 are engaged with hub flanges 118, 120, and 122, respectively, such that clamp 14 applies a substantially uniform compressive force onto disc 16 along annular disc contact surface 168. Disc 16 may transmit the compressive force to disc 156 (not shown in FIG. 7B). In this way, discs 16 and 156 are substantially clamped to hub 18. When disc stack assembly 12 is implemented into a disc drive system (e.g., disc drive system 10 of FIG. 1), a spindle motor rotates shaft 90, which thereby rotates hub 18, which is coupled to shaft 90. As hub 18 rotates, clamp 14 and discs 16 and 156, which are coupled to hub 18, rotate.

Various embodiments of the invention have been described. These and other embodiments are within the scope of the following claims. For example, while fixture assemblies configured to receive a disc drive, in other embodiments, the fixture assemblies described herein may be configured to receive any work piece, such as other data storage and retrieval systems.

The invention claimed is:

1. An assembly comprising:
   a crowder plate having a first portion connected to a second portion by at least two support members, at least one of the support members configured to flex in a z-axis direction; and
   a datum plate coupled to the second portion of the crowder plate and configured to receive a work piece, wherein the datum plate is configured to gimbal relative to the first portion of the crowder plate and substantially maintain a position along x-axis and y-axis directions relative to the first portion of the crowder plate, the x-axis, y-axis, and z-axis directions being substantially orthogonal.

2. The assembly of claim 1, wherein the at least two support members are shear pads.

3. The assembly of claim 1, further comprising a platform coupled to the crowder plate, wherein the crowder plate is configured to translate along the x-axis and y-axis directions relative to the platform.

4. The assembly of claim 3, further comprising shear pads coupling the crowder plate to the platform.

5. The assembly of claim 1, wherein at least two of the support members configured to flex in a z-axis direction.

6. The assembly of claim 1, wherein the at least two support members substantially resist compression.

7. An assembly comprising:
   a crowder plate;
   a datum plate configured to receive a work piece and coupled to the crowder plate; and
   a platform coupled to the crowder plate by support members that permit the crowder plate to translate along at least x-axis and y-axis directions relative to the platform and maintain a position relative to the platform in a z-axis direction.

8. The assembly of claim 7, wherein the support members are shear pads.

9. An assembly comprising:
   a crowder plate having a first portion connected to a second portion by four support members that are flexible in a z-axis direction; and
   a datum plate coupled to the second portion of the crowder plate, wherein the datum plate substantially maintains a position along x-axis and y-axis directions relative to the first portion of the crowder plate but moves in the z-axis direction.

10. The assembly of claim 9, wherein the support members substantially resist compression.

11. The assembly of claim 10, wherein the support members are shear pads.

12. The assembly of claim 9, wherein the datum plate rotates with respect to the first portion of the crowder plate.

* * * * *